March 31, 1959 E. H. GATZERT 2,880,277

CODE CALL CIRCUITS

Filed Aug. 15, 1955 8 Sheets-Sheet 1

INVENTOR.
ERNEST H. GATZERT
BY F. H. Henson
AGENT

March 31, 1959 E. H. GATZERT 2,880,277

CODE CALL CIRCUITS

Filed Aug. 15, 1955 8 Sheets-Sheet 2

March 31, 1959 E. H. GATZERT 2,880,277

CODE CALL CIRCUITS

Filed Aug. 15, 1955 8 Sheets-Sheet 3

March 31, 1959 E. H. GATZERT 2,880,277

CODE CALL CIRCUITS

Filed Aug. 15, 1955 8 Sheets-Sheet 4

March 31, 1959 E. H. GATZERT 2,880,277

CODE CALL CIRCUITS

Filed Aug. 15, 1955 8 Sheets-Sheet 5

March 31, 1959 E. H. GATZERT 2,880,277

CODE CALL CIRCUITS

Filed Aug. 15, 1955 8 Sheets-Sheet 6

March 31, 1959 E. H. GATZERT 2,880,277

CODE CALL CIRCUITS

Filed Aug. 15, 1955 8 Sheets-Sheet 7

March 31, 1959 E. H. GATZERT 2,880,277
CODE CALL CIRCUITS
Filed Aug. 15, 1955 8 Sheets-Sheet 8

United States Patent Office 2,880,277
Patented Mar. 31, 1959

2,880,277

CODE CALL CIRCUITS

Ernest H. Gatzert, Rochester, N.Y., assignor to General Dynamics Corporation, a corporation of Delaware Application August 15, 1955, Serial No. 528,503

9 Claims. (Cl. 179—18)

Figure 1:
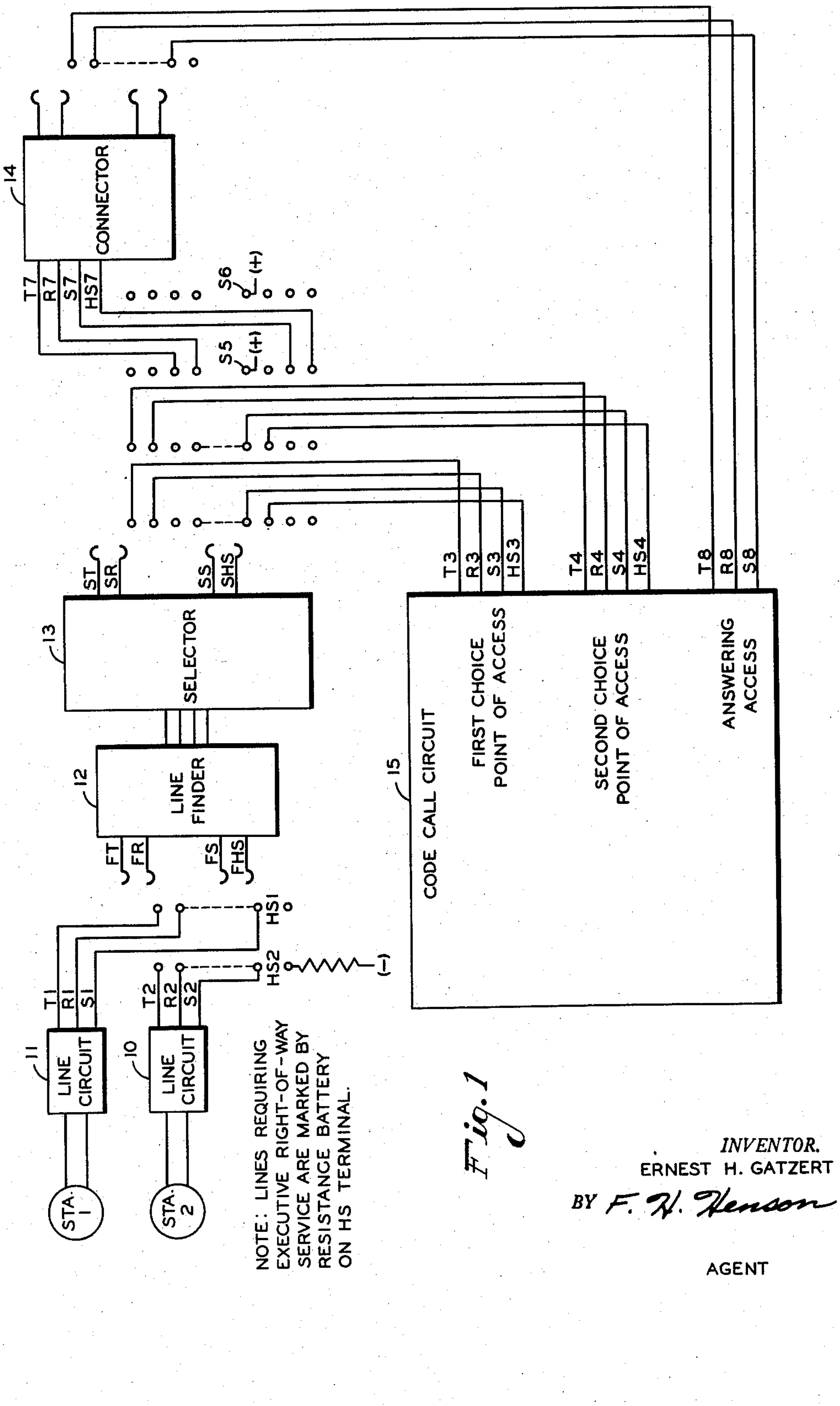
Figure 2:
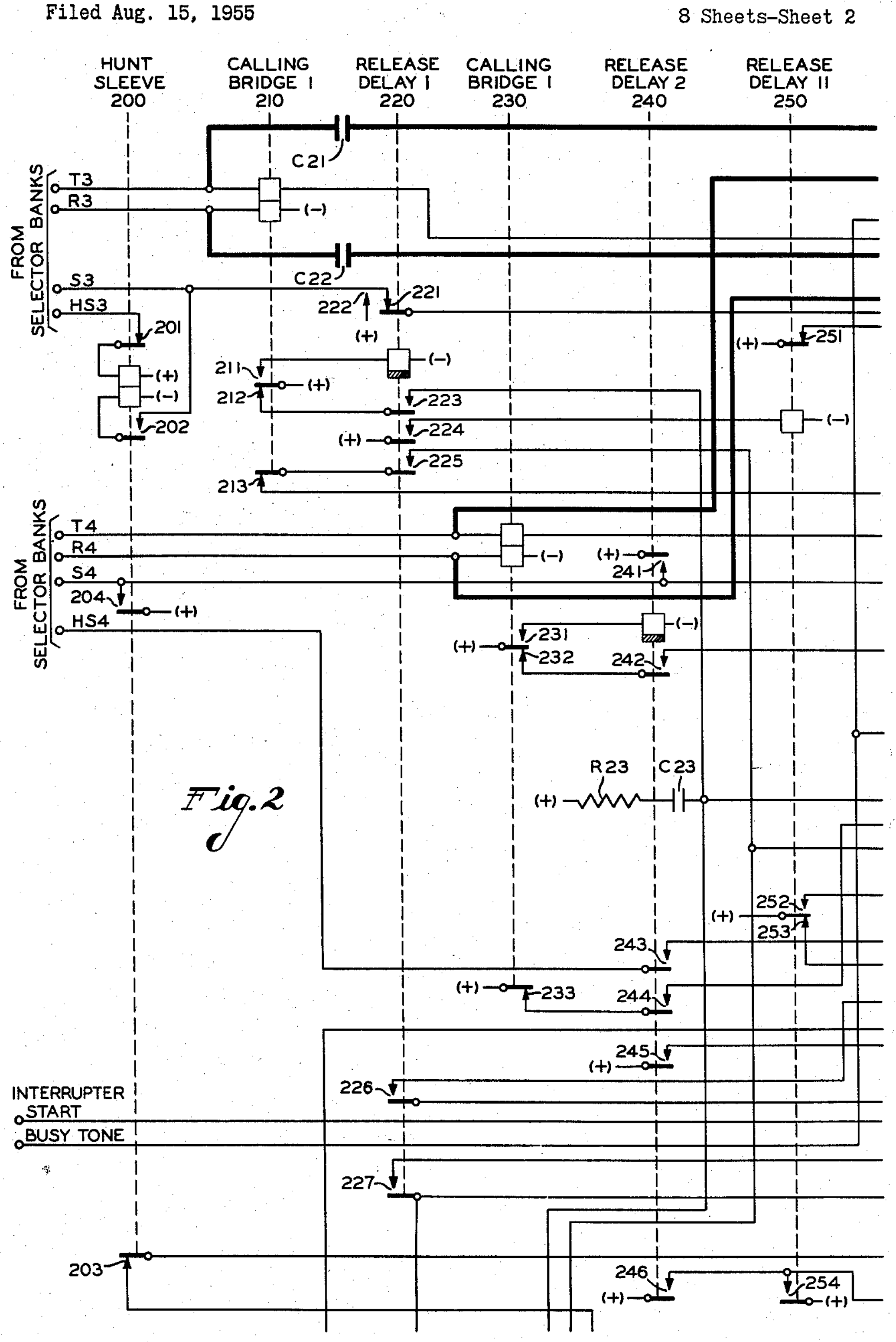
Figure 3:
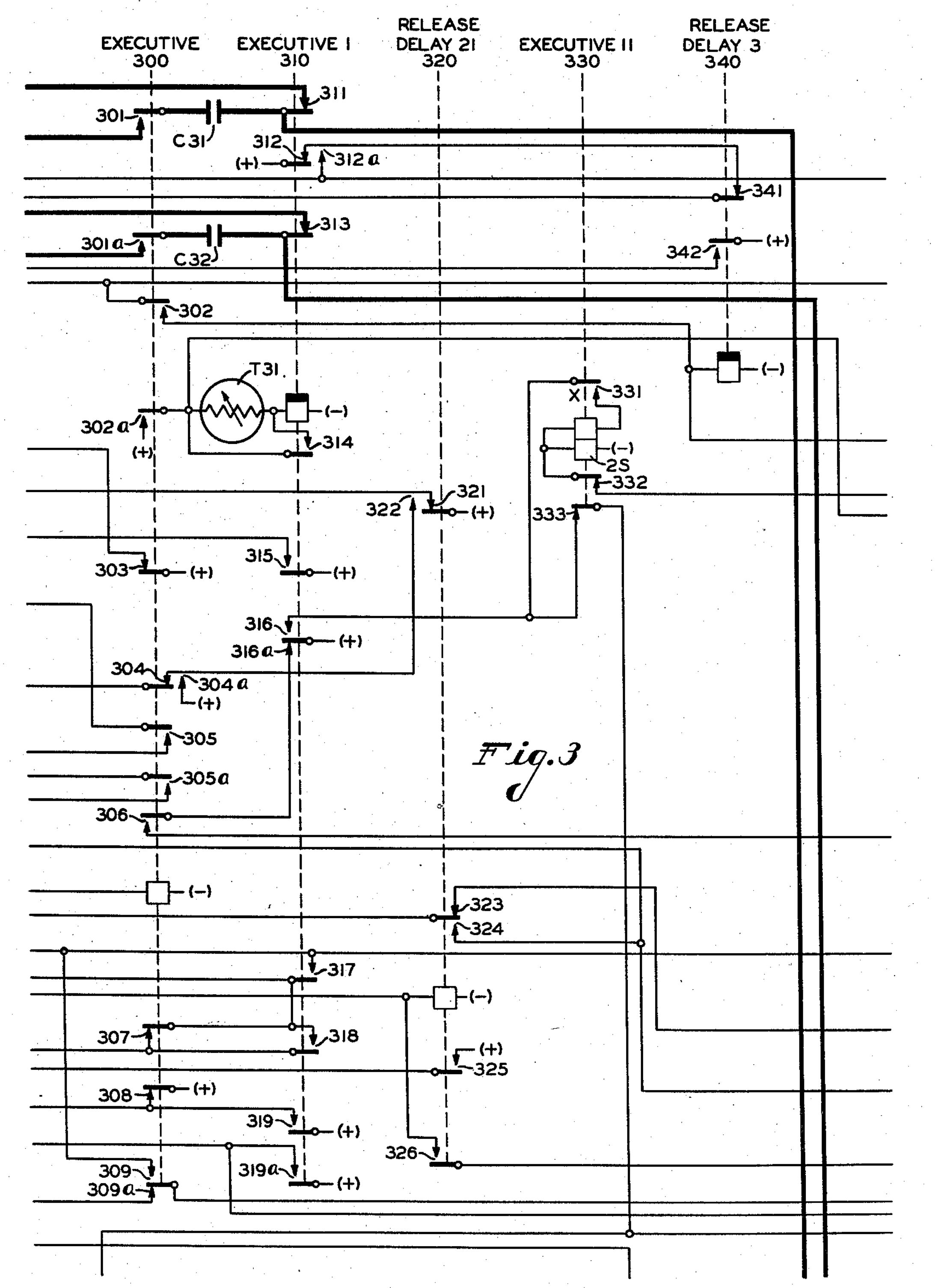
Figure 4:
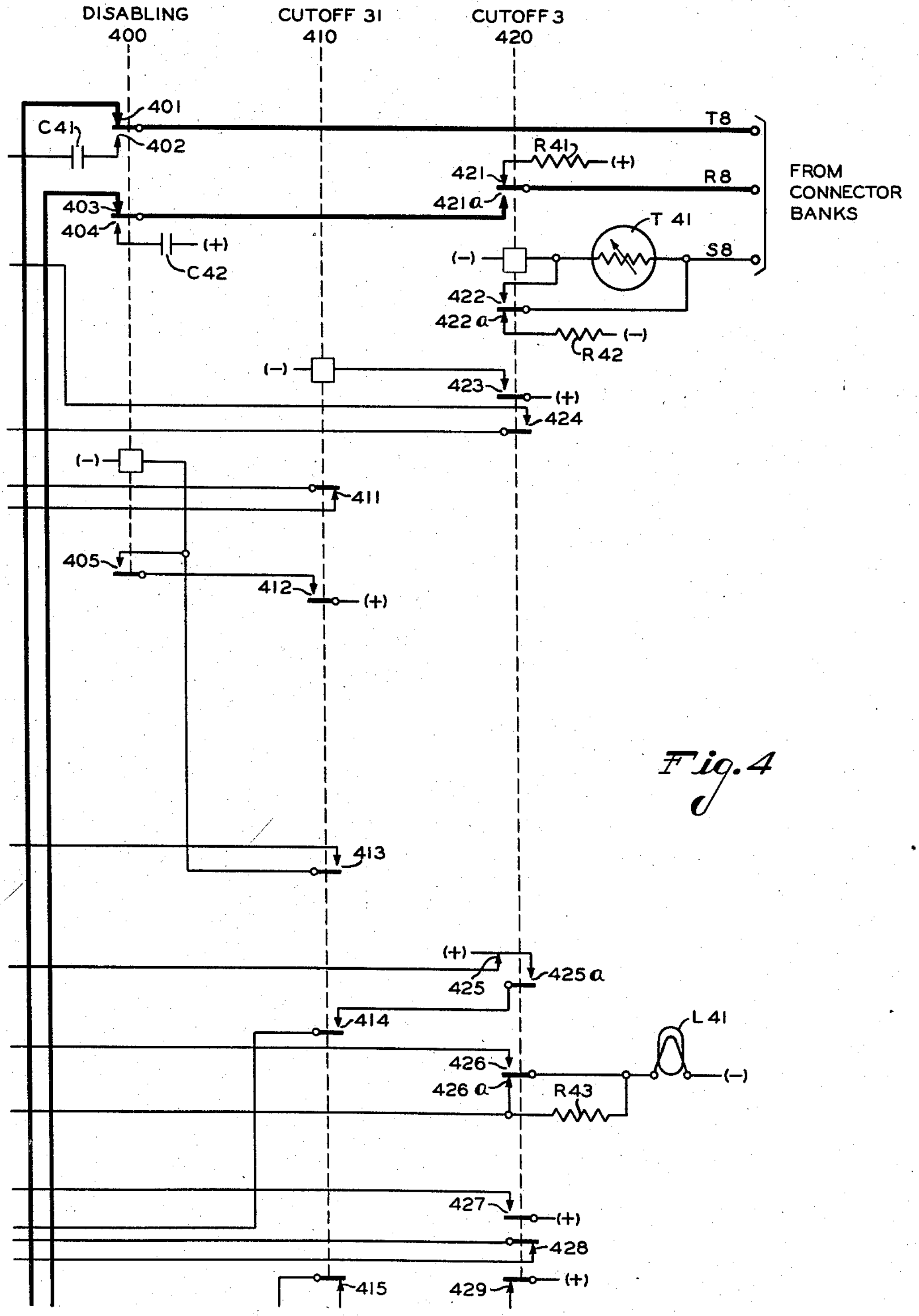
Figure 5:
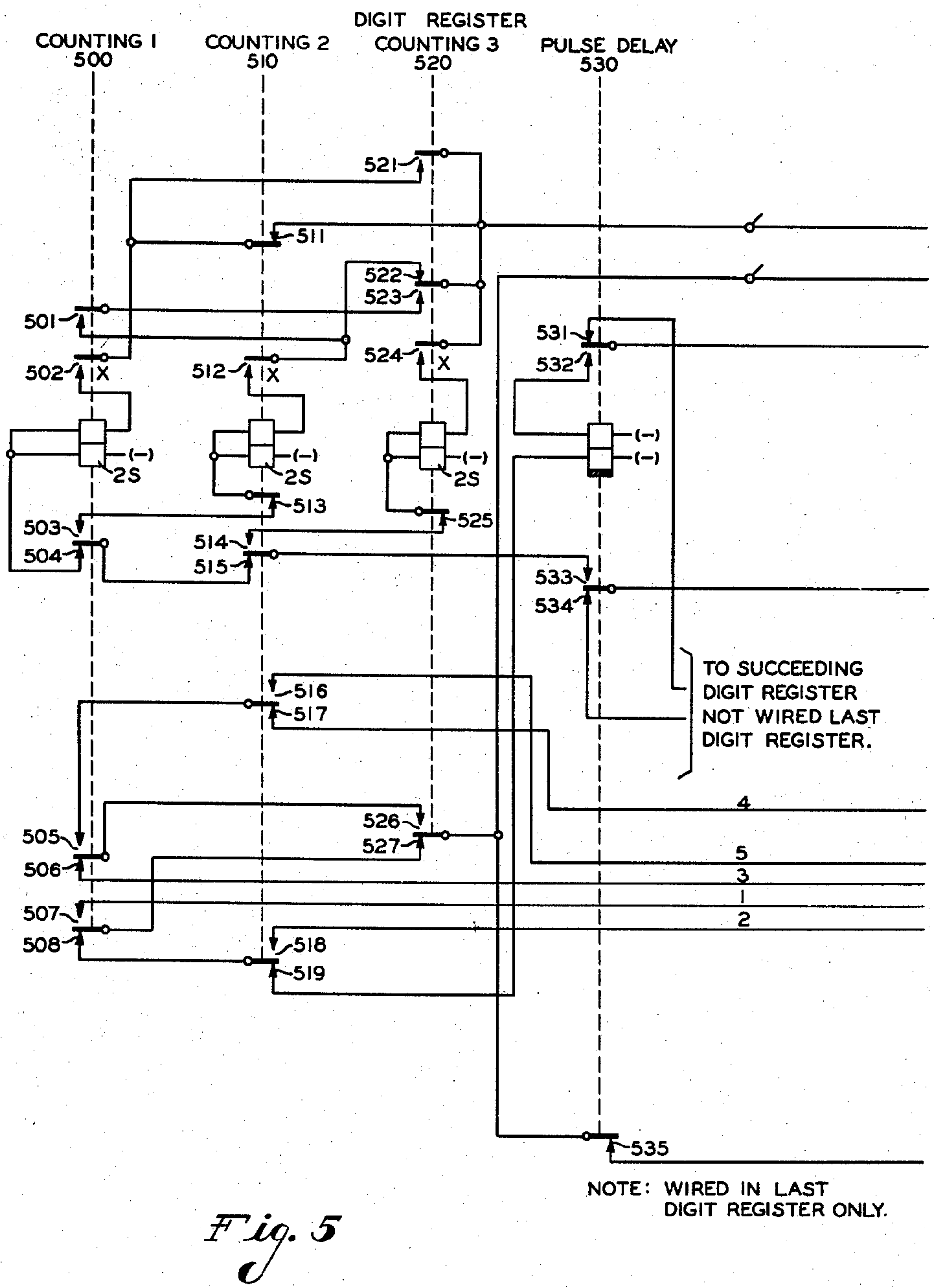

This invention relates to telephone systems and more particularly to code call circuits for use in telephone systems.

In small telephone systems, which are usually privately owned, it is often necessary to provide special features which are unnecessary in a large public exchange. For example, a code call circuit is usually provided so that a person temporarily absent from his desk may be summoned by way of signal devices placed at different locations throughout the establishment. The usual method of operation is for the calling party to dial the line number of the desired called line. Upon learning that the desired party is absent from his desk, the calling party releases the connection and then dials a special digit or digits to seize the code call circuit followed by the digits of the code number assigned to the desired called party. The code call circuit serves to register the digits of the code number and then repeatedly transmits the registered code number to the signal devices. The wanted party upon hearing the code produced by the signal devices, answers the call by establishing connection with the code call circuit from the nearest telephone. This terminates the transmittal of the code signal and completes the talking connection between the calling and called parties.

The executive right-of-way feature is also usually provided in the connectors of the small telephone system. The connectors of the system are usually designed such that a calling executive can establish a communication connection to the selected busy called line by dialing a suffix digit after receiving busy tone. The connector switches through to the called line after the parties to the previous connection hang up.

Prior to this invention, the executive lines have not been given priority over regular lines in the use of the code call circuit. The establishing of a communication or monitoring connection from the executive line to the previously established code call connection is of little or no avail since neither party to the previously established connection would necessarily be the party desired by the calling executive. Furthermore, when the parties to the connection and the executive hang up, there is nothing to prevent any other subscriber from seizing the single code call circuit provided in the office.

Accordingly, it is the general object of this invention to provide a new and improved telephone system.

It is a more particular object of this invention to provide a new and improved telephone system in which executive lines are given priority over regular lines in the use of a code call circuit provided in the system.

The invention herein disclosed accomplishes the above cited objects by providing a code call circuit having two points of access which terminate in successive sets of terminals in a predetermined level of the selector banks.

The selectors, of course, select the first choice point of access unless it is marked as busy, and select the second choice point of access only if the first choice point of access is marked as busy and the second choice point of access is idle. If both points of access are busy, the selector switch hunts to overflow and the calling party is given busy tone in the well known manner.

The subscriber lines of the system are divided into first and second classes comprising regular and executive lines, respectively. Executive lines are marked with resistance battery on a second control conductor which is extended through the line finder-selector to the code call circuit. If a regular line seizes the code call circuit over the first choice point of access, only the first choice point of access is marked as busy. If an executive line seizes the code call circuit over the first choice point of access, both the first and second choice points of access are marked as busy. Thus, the code call circuit can be seized over the second choice point of access only after a regular subscriber line has seized the circuit over the first choice point of access.

When the code call circuit is seized over the second choice point of access by an executive line, the transmittal of the code set up by the regular subscriber line is terminated, or, if the call has been answered, the communication connection between the regular subscriber line and the called line is interrupted and both parties given busy tone. The executive line then controls the code call circuit to register and transmit the code of the same or another wanted party.

If a regular subscriber line should seize the code call circuit over the second choice point of access, the previously established call is not interfered with in any manner. Rather, busy tone is applied to the regular subscriber line so as to inform the party thereon that the code call circuit is busy.

Further objects and advantages of the invention will become apparent as the following description proceeds and the features of novelty which characterize the invention will be pointed out in particularity in the claims annexed to and forming a part of this specification.

For a better understanding of the invention, reference may be had to the accompanying drawings which consist of nine figures on eight sheets.

Fig. 1 shows the trunking diagram of a telephone system; and

Figure 6:
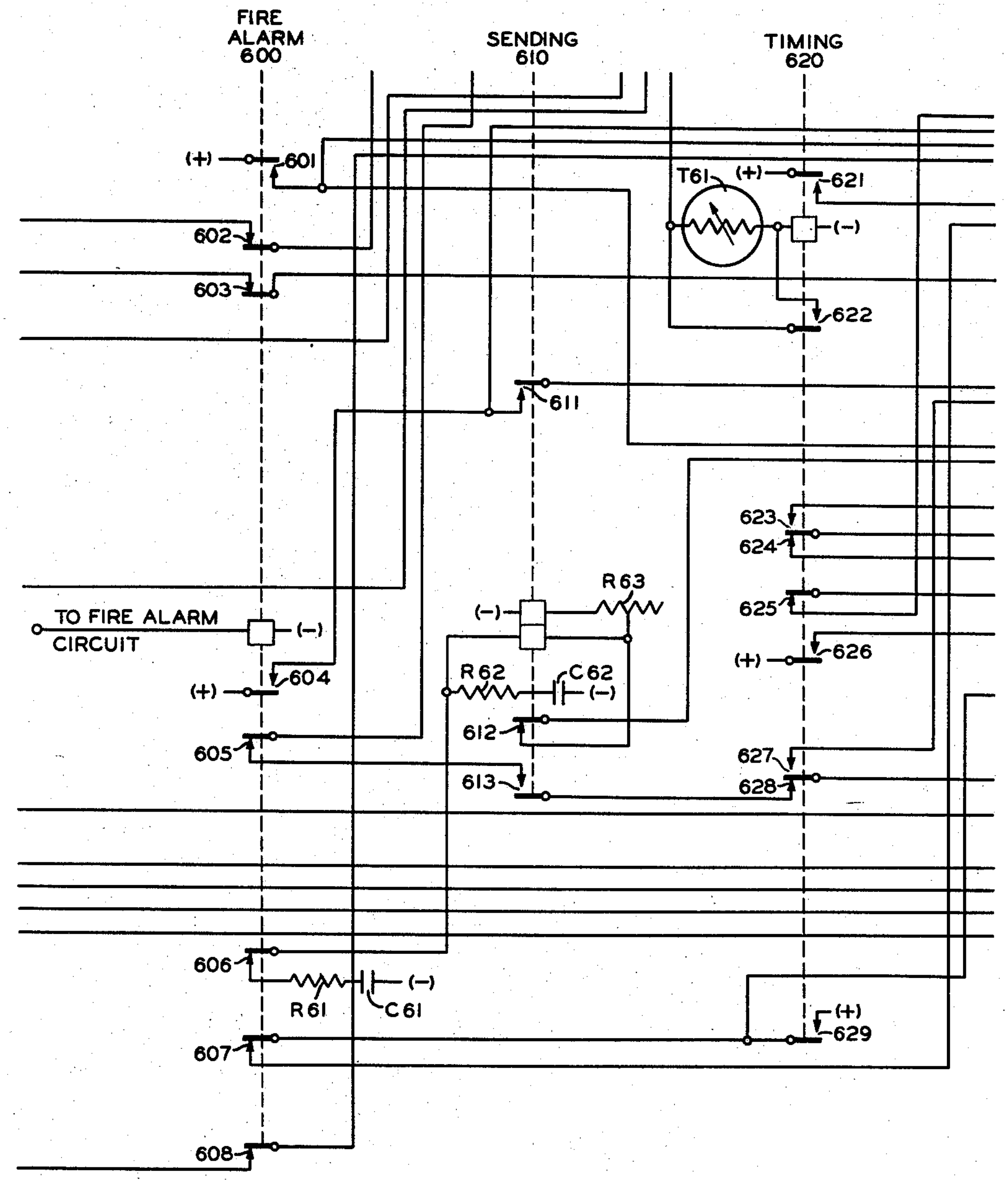
Figure 7:
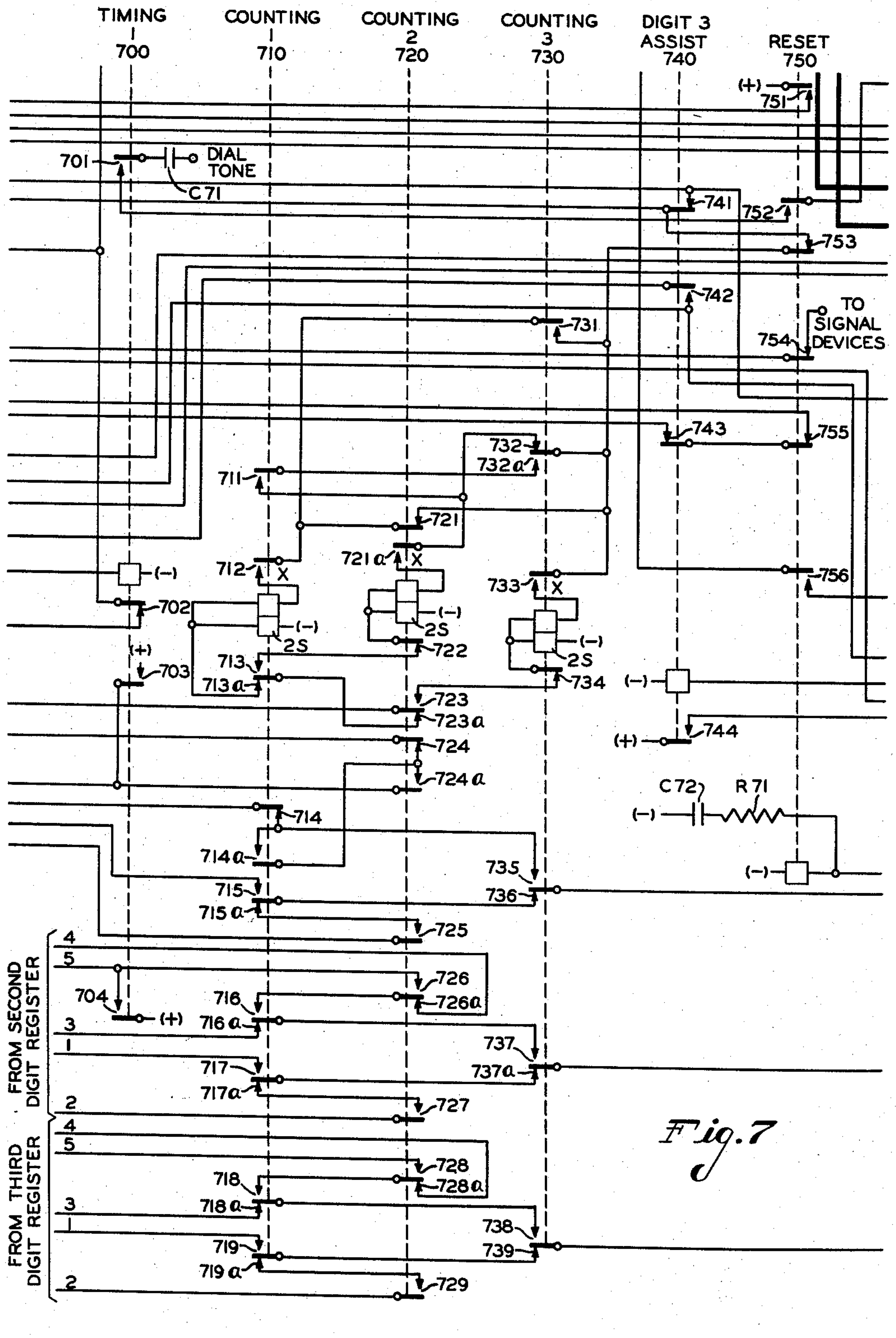
Figures 8, 9:
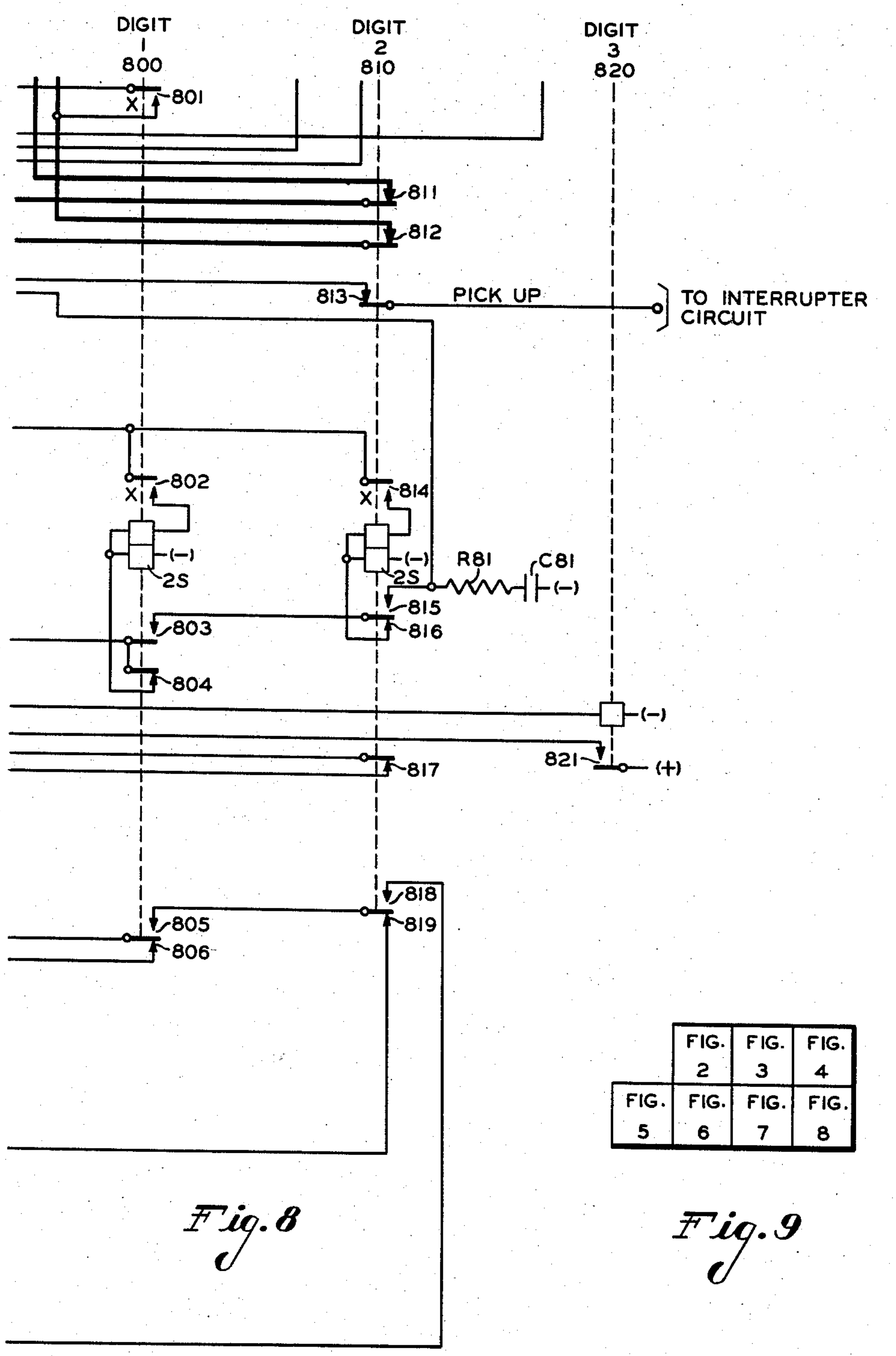

Figs. 2–8, inclusive, when arranged in the manner shown in Fig. 9, show the circuit details of a code call circuit for use in a telephone system.

The general operation of the system can best be understood by reference to the trunking diagram of Fig. 1. The system has been illustrated as including flat type step-by-step switches of the type sold under the trademark "XY." For a detailed description of this switch, reference may be had to the Frank A. Morris Patent 2,567,650, which issued September 11, 1951, and is assigned to the same assignee as the present invention. Briefly, the switch has a main set of brushes, namely, line conductors tip and ring, and control conductors sleeve and auxiliary, which move horizontally in a primary direction to select a level of terminals and then move into the banks to select a particular set of terminals in the selected level.

As shown, line circuit 11 terminates a regular subscriber line as identified by the fact that resistance battery marking is not connected to terminal HS1 in the line finder banks, while line circuit 10 terminates an executive right-of-way line as identified by the connection of resistance battery to terminal HS2 in the line finder banks. In the normal course of events a call is extended from either a calling regular or executive line to a called line by way of line finder 12, selector 13, selector bank contacts T7, R7, S7 and HS7 and connector 14. The subscriber lines, of course, terminate in sets of terminals in the connector banks. Connector 14 has been shown as terminating in the third set of contacts in the second level of the selector banks. It is to be understood that similar connectors terminate in the first, second and other sets of terminals in that particular level.

The code call circuit 15 is accessible to regular and executive lines through the first and second sets of terminals in the first level of the selector banks. If the first set of terminals is idle, as indicated by absence of ground on conductor S3, the selector switches through on the first set of terminals and thus seizes the code call circuit 15 over conductors T3, R3, S3, and HS3. If the conductor S3 is connected to ground in the code call circuit 15, the selector switches through on the second set of terminals and thus seizes code call circuit 15 over conductors T4, R4, S4, and HS4 provided that conductor S4 is not connected to ground. If both points of access to code call circuit 15 are busy, the selector switch hunts to overflow since terminals S5, S6 and the remainder of the sleeve terminals in the first level of the selector banks are permanently connected to ground.

As previously described, the code call circuit serves to register the code of the wanted party and then transmits the code to signal devices at various locations in the establishment. The wanted party, upon hearing the sounding of his code, dials the special code call answering number to seize the code call circuit 15 over conductors T8, R8, and S8 which terminate in the connector banks.

A detailed description of the system follows.

*Call from station STA1—Code call equipment idle*

Assume that the code call equipment is idle and a subscriber at station STA1 controls selector 13 to seize the code call circuit of Figs. 2–8, inclusive, over the first point of access comprising conductors T3, R3, S3, and HS3. Calling bridge 1 relay 210 operates responsive to seizure over a circuit extending from ground on contacts 312, through contacts 341, its upper winding, over the tip conductor T3, through the loop closed at station STA1, back over the ring conductor R3, and through its lower winding to battery. At its operated contacts 211, relay 210 closes an obvious operating circuit for release delay 1 relay 220.

Release delay 1 relay 220, in operating, grounds sleeve conductor S3 at contacts 222. It will be noted that sleeve conductor S4 of the second choice point of access is not grounded and thus the second choice point of access remains idle when a line of the first class seizes the code call circuit. At contacts 224, relay 220 closes an obvious operating circuit for release delay 11 relay 250. At contacts 227, relay 220 closes an operating circuit for the pulsing delay relays in each of the digit registers. Only one digit register has been shown but it is to be understood that in practice there would be up to three of such registers for a system having 125 codes. Pulsing delay relay 530 in the first digit register operates over a circuit extending from ground on contacts 308, through contacts 227, contacts 428, contacts 603, contacts 527, contacts 508, contacts 519, and through its lower winding to battery. The pulsing delay relays in the other registers operate in an identical manner since the conductor extending from contacts 603 on the fire alarm relay 600 to the digit register is multipled to all of the digit registers.

Relay 250, in operating, closes ground at its contacts 252, through contacts 426*a*, and through monitor lamp L41 to battery. Monitor lamp L41 is thus illuminated in its bright condition showing that the code call circuit has been seized but has not been answered.

Assume that the code of the wanted party comprises the digits "541." When a subscriber at station STA1 dials the digit "5," calling bridge 1 relay 210 will, of course, release and reoperate five times. Pulsing ground for the digit registers is derived from contacts 303, through break contacts 213 on relay 210, contacts 225, through the operated contacts 533 on the pulsing delay relay 530 in the first digit register, through contacts 515, contacts 504, and through the lower winding of the two step counting 1 relay 500 to battery. The first pulse operates relay 500 to its first step. The closing of the preliminary make contacts 502 serves to shunt the upper winding of relay 500 with ground derived from contacts 425 through contacts 226, contacts 307, contacts 602, and contacts 511. When calling bridge 1 relay 210 reoperates at the termination of the first pulse, relay 500 operates from the ground through its contacts 502 since its windings are now connected in series aiding. The second ground pulse from relay 210 over the previously described pulsing path serves to operate counting 2 relay 510 to its first step through contacts 503 and 513. When relay 210 reoperates at the termination of the second pulse, relay 510 operates to its second step and at its contacts 511, opens the operating circuit to relay 500 which releases. The release of relay 210 in response to the third dial impulse serves to operate counting 3 relay 520 to its first step through contacts 514 and 525. At the termination of the third impulse, relay 520 operates to its second step and at break contacts 522 opens the operating circuit for relay 510, which releases. The fourth dial impulse serves to operate relay 500 to its first step through contacts 515 and 504. At the termination of the pulse, relay 500 locks operated through make contacts 521 to the previously described locking ground. The fifth dial impulse operates relay 510 to its first step through contacts 515, 503, and 513. At the termination of the fifth impulse, relay 510 operates to its second step through contacts 512, 501, and 523. Thus, at the conclusion of the dialing of the digit "5," relays 500, 510, and 520 are operated. During the dialing of the first digit, pulsing delay relay 530 remains operated over a circuit from ground on contacts 212, through contacts 223, 532, and through its upper winding to battery. At the conclusion of the first digit, pulsing delay relay 530 in the first digit register releases since its original operating circuit is opened by any one of the counting relays, and its holding circuit is deenergized in the pause between digits for a sufficient interval of time to allow its release.

The release of relay 530 serves to transfer the pulsing paths from the calling bridge 1 relay 210 to the second digit register. The impulsing path is connected through break contacts 534 to the next register and the holding path for the pulse delay relay is transferred through break contacts 531 to the next register. The second digit "4" is stored in the second register. In that register, the relays corresponding to 500 and 520 remain operated at the completion of the digit. The third digit "1" is stored in the third digit register. In that register, the relay corresponding to 500 is the only relay operated at the completion of the digit.

When the pulsing delay relay, corresponding to relay 530, releases in the last register, a start ground is transmitted to the digit sender of Figs. 6, 7, and 8. The circuit extends from ground on contacts 308, through contacts 227, contacts 428, contacts 603, through break contacts 535 on the pulsing delay relay in the last digit register, contacts 608, contacts 415, contacts 755, contacts 743, contacts 612, resistor R63, and through the upper winding of the sending relay 610 to battery. It will be noted that this starting ground is routed through break contacts 612 on relay 610 so that this relay is operated self-interrupt. The speed of the relay is controlled by the size of the elements of the resistor-capacitor network comprising resistors R62 and R61 connected in series with capacitors C62 and C61, respectively, to battery. The windings of relay 610 are differentially connected so that the operation of relay 610 is delayed for the charge time of the capacitors at which time the windings oppose each other. The release time of the relay is delayed by the discharge times of the capacitors at which time the windings of relay 610 are aiding.

Each time that sending relay 610 operates, ground is connected to the signal devices, which are located at different points throughout the establishment, over a circuit extending from ground on contacts 429, through contacts 611 on the sending relay 610 and contacts 754. The digit sender is controlled at this time to count the number of impulses transmitted to the signal devices by sending relay 610, and to terminate the energization of the signal devices when a number of impulses corresponding to the code stored in the digit registers has been sent. At its operated contacts 613 the sending relay energizes the counting chain in the digit sender over a circuit extending from ground on contacts 308, through contacts 227, contacts 605, operated contacts 613 on relay 610, through contacts 628, 723*a*, and 713*a* to the counting 1 relay 710. The operation of the counting chain comprising relays 710, 720, and 730 is identical to the operation of the counting chain of the digit register, previously described. Thus, the first impulse operates relay 710 to its first step and the termination of that impulse serves to operate relay 710 completely over a circuit extending from ground on contacts 308, through contacts 227, contacts 428, contacts 702, contacts 607, contacts 753, 721, and through the preliminary make contacts 712 on relay 710. The second pulse operates counting 2 relay 720 which releases relay 710 at contacts 721. The third impulse operates counting 3 relay 730 which, when fully operated, releases relay 720 at its contacts 732. The fourth impulse from the sending relay 610 operates counting 1 relay 710 which then locks through operated contacts 731 on relay 730. The fifth impulse operates counting 2 relay 720 which then locks operated through contacts 711 and 732*a*.

It will be remembered that the digit "5" was stored in the first digit register as denoted by the fact that all three of the counting relays of the first digit register are in the operated condition. Since the setting of the sender counting chain now corresponds to the setting of the first digit register, the sounding of the first digit of the code is complete and thus the reset relay 750 is operated to open the self-interrupt path for sending relay 610 at break contacts 755. Reset relay 750 operates over a circuit extending from ground on contacts 308, through contacts 227, 428, 603, 526, 505, 516, over conductor 5, through contacts 724*a*, 714*a*, 735, 806, and through the winding of the relay to battery. The counting chain in the digit sender is now reset since the holding circuit for the counting relays 710, 720, and 730 is opened at break contacts 753 on relay 750. Digit 1 relay 800 now operates to its first step from ground on contacts 254, through operated make contacts 756 on relay 750, through contacts 804, and its lower winding to battery. The holding ground for relay 800 is derived through break contacts 741 and its preliminary make contacts 802. The release of the counting chain relays results in the disconnection of reset relay 750 from the conductor 5 extending from the first digit register and thus relay 750 is deenergized. Relay 750 is made slow release by virtue of the connection of resistor R71 and capacitor C72 to battery connected in parallel with its winding. When relay 750 releases, the opening of contacts 756 serves to allow the operation of the digit 1 relay 800 to its second step from the ground through its preliminary make contacts 802, as previously described. Also, the release of relay 750 reestablishes the self-interrupt path for the sending relay 610 at break contacts 755.

The second digit is transmitted in an identical manner under control of the second digit register. It will be remembered that the second digit register had stored the digit "4" and thus, when counting relays 710 and 730 in the digit sender are operated, denoting that four impulses have been transmitted by sending relay 610, reset relay 750 is again operated. The operating circuit for relay 750 extends from ground on conductor 4 from the second digit register through contacts 726*a*, 716, 737, 819, and operated make contacts 805 on the digit 1 relay 800. When relay 750 operates, the holding ground for the counting relays 710 and 730 is interrupted at break contacts 753 and the energizing circuit for sending relay 610 is opened at contacts 755, as previously described. Digit 2 relay 810 operates to its first step through contacts 756, 803, and 816. The release of the counting relays 710 and 730 disconnects relay 750 from the ground on conductor 4 from the second digit register and thus this relay is deenergized. When relay 750 releases, digit 2 relay 810 operates to its second step and the energizing circuit for relay 610 is completed at break contacts 755 on reset relay 750.

It will be remembered that the third digit "1" was stored in the third digit register and thus a ground appears on conductor 1 from that register. The first pulse from sending relay 610 operates counting 1 relay 710 and an operating circuit is completed for reset relay 750 from ground on conductor 1 through contacts 719, 739, 818, and 805. An operating circuit is now completed for the digit 3 relay 820 from ground through operated contacts 756, 803, 815, through break contacts 624, and through the winding of the relay to battery. At contacts 821, relay 820 closes an obvious operating circuit for digit 3 assist relay 740. The operation of relay 750 also serves to open the operating circuit for the sending relay 610 at break contacts 755 and the holding circuit for counting 1 relay 710 at break contacts 753, as previously described. When relay 710 releases, the operating circuit for relay 750 is opened and this relay releases. The holding circuit for digit 3 relay 820, which extends from ground on contacts 751 through contacts 625 and 742, is opened when relay 750 releases. Relay 820 is made slow release by the inclusion of resistor R81 and capacitor C81 to battery connected in parallel with its winding.

Returning to the operation of the digit 3 assist relay 740, it can be seen that contacts 743 on that relay further open the energizing circuit for the digit sending relay 610, and break contacts 741 open the holding circuit for the digit 1 and digit 2 relays 800 and 810. When relay 820 releases, the energizing circuit for relay 740 is opened and this relay releases to reestablish the operating circuit for relay 610. It can be seen that the reset relay 750 will now be controlled by the first digit register since relays 800 and 810 are in the released condition. Thus, the code sender is completely reset and the first, second, and third digits of the register code are now repeated. It is to be noted that the interval of time between the sounding of the digits of the code is controlled solely by the release time of relay 750 while the interval between the sounding of codes is controlled solely by the release time of relay 750 plus the release time of relay 820. Thus there is a uniform delay between digits and a different uniform delay between codes.

The wanted party upon hearing the sounding of his code, dials the code call answering number from the nearest telephone. The connector circuit controlled by the wanted party seizes the code call circuit over conductors T8, R8, and S8, shown at the upper right of Fig. 4. Ground through resistor R41 and contacts 421 serves to trip the ringing in the connector circuit in the well known manner. Cutoff 3 relay 420, which is made slow operate by virtue of the inclusion of thermistor T41 in its operating circuit, operates from ground forwarded over sleeve conductor S8 from the connector circuit. At contacts 422, relay 420 connects its winding directly to conductor S8 and short circuits the thermistor T41. It will be noted that resistance battery through resistor R42 and contacts 422*a* is connected to sleeve conductor S8 before relay 420 operates to provide an operating circuit for the switch-through relay in the connector circuit.

At contacts 423, relay 420 closes an obvious operating circuit for cutoff 31 relay 410. At contacts 425, relay 420 opens the holding circuit for all operated counting relays in the digit register circuits. At contacts 428, relay 420 opens the holding circuit for all operated impulse counting and digit counting relays in the digit sender. At contacts **426*a*, relay 420 removes the short circuit for resistor R43 which causes the monitor lamp L41 to be illuminated dimly to signify that the call has been answered. At contacts 429, relay 420** removes the energizing ground for the signal devices so that the transmittal of the code will be terminated immediately upon answering.

A communication connection, or conversation path, is completed between the calling and answering parties. It can be seen that tip conductor T3 is connected to tip conductor T8, through capacitor C21, contacts 311, contacts 811, and contacts 401. Ring conductor R3 is connected to ring conductor R8, through capacitor C22, contacts 313, 812, 403, and contacts **421*a***. Thus, the calling and called parties can now converse.

Means are provided in the code call circuit for timing out a call initiated by a regular subscriber line after 60 seconds. Timing relay 620, which is made slow operate by the inclusion of thermistor T61 in series with its operating path, is operated over a circuit extending from ground on contacts **425*a*, through contacts 414, 309*a*, 203, through thermistor T61**, and through its winding to battery.

At its operated contacts 622, relay 620 short circuits thermistor T61 and thus connects its winding directly to the operating ground. Timing 1 relay 700 operates from ground through operated contacts 626 on relay 620. At contacts 703 and 704, relay 700 connects ground to the fifth conductors extending from the first and second digit registers, respectively, to the digit sender.

Digit 3 relay 820 is now operated from a pickup pulse appearing on the pickup conductor from the interrupter circuit every 6 seconds. The operating circuit for relay 820 extends from ground on the pickup conductor through contacts 813, 623, and through its winding to battery. Digit 3 assist relay 740 operates from ground on contacts 821. The counting relays 710, 720, and 730 are reused to count the number of pickup pulses transmitted to the circuit and thus serve to measure the timing interval. The first operation of relay 740 serves to operate counting 1 relay 710 to its first step over a circuit extending from ground on contacts 744 through contacts 817, 627, **723*a*, and 713*a*. At the termination of the first pickup pulse, relays 820 and 740 release and relay 710 operates to its second step over a circuit extending from ground on contacts 629, through contacts 607, 753, 721, and through its preliminary make contacts 712. The subsequent operations of relay 740 are counted by the relays 720, 730, and 710 until the relay has been operated and released five times, which signifies that 30 seconds have elapsed. Reset relay 750 operates, when all three counting relays are operated, from ground on contacts 703 through contacts 724*a*, 714*a*, 735, and 806. The first operation of reset relay 750 serves to operate the digit 1 relay 800** to its first step, as previously described.

Dial tone is now connected to the conversation path to inform the subscribers that they have just 30 seconds remaining in which to terminate their conversation. The circuit extends from the dial tone conductor in Fig. 7 through capacitor C71, contacts 701, contacts 752, and preliminary make contacts 801 to the ring conductor. The operation of reset relay 750 also serves to release the counting chain relays at contacts 753. When the counting chain relays release, the energizing circuit for relay 750 is opened and that relay releases. The opening of contacts 756 serves to operate digit 1 relay 800 to its second step, as previously described. The counting chain is then utilized to count five more operations of relay 740, at which time reset relay 750 is again operated from ground on contacts 704 through contacts 726, 716, 737, 819, and 805. Digit 2 relay 810 operates to its first step through contacts 756, 803, and 816. When the counting relays release, reset relay 750 is deenergized to open contacts 756 and relay 810 operates to its second step. At contacts 811 and 812, relay 810 opens the conversation path between the calling and called subscribers, and at contacts 813, opens the pickup conductor from the sender circuit.

If the answering party should hang up before the calling party restores his handset, relays 420 and 410 release. Under these conditions, the reclosing of break contacts 428 on relay 420 serves to complete the original operating path for the pulsing delay relays corresponding to 530 in all of the digit register so that the sending relay 610 will not be operated to transmit code signals. It will be remembered that the counting relays in the various registers were released when the called party answered and thus it was necessary to reoperate the pulsing delay relays to prevent the start ground from being transmitted to the sender circuit through break contacts corresponding to contacts 535. When the calling party restores his handset, relays 210, 220, 250, and the 530 relays release to restore the circuit to normal.

If the calling party should hang up before the called party restores his hand set, relays 210, 220, and 250 release. When relay 220 releases, ground is removed from sleeve conductor S3 to release the preceding selector and line finder circuits. Relay 340 now operates from ground on contacts 251, through contacts 424, and through its winding to battery. At its operated contacts 342, relay 340 reconnects ground to sleeve conductor S3 to mark the circuit as busy so long as the called party remains off-hook.

*Call from station STA1—Code call equipment busy*

Assume that the code call equipment is busy with a call from a regular subscriber line. Thus, conductor S3 is marked as busy and conductor S4 is marked as idle. A regular subscriber line seizing the code call circuit over the second choice point of access comprising conductors T4, R4, S4, and HS4 is given busy tone to inform him that the code call circuit is busy. Calling bridge 2 relay 230 operates over a circuit extending from ground on contacts 321, through the upper winding of the relay, over tip conductor T4, through the loop closed at the calling substation, back over the ring conductor R4, and through the lower winding of the relay to battery. Release delay 2 relay 240 operates from ground on contacts 231. Release delay 21 relay 320 operates from ground on contacts 245. The ground for the upper winding of relay 230 is now shifted to the grounded busy tone conductor through operated contacts 322 and break contacts 304. Thus, the conversation on access 1 or the sounding of the code dialed by the regular subscriber line on access 1 is not interfered with in any manner.

*Call from station STA2—Code call equipment idle*

Assume that the code call equipment is idle and that an executive line seizes the code call circuit over access 1. Seizure of the circuit is identical to the seizure previously described by a regular subscriber line except that hunt sleeve relay 200 operates from resistance battery forwarded over the HS3 conductor, through contacts 201, and through its upper winding to ground. The hunt sleeve relay locks operated from ground on the S3 conductor applied by contacts 222 and through contacts 202 and its lower winding to battery. At its operated contacts 204, relay 200 connects ground to the sleeve conductor S4 of the second choice point of access. Thus it can be seen that when an executive line seizes the code call circuit over the first choice point of access, both the first and second choice points of access are marked as busy. Calls from either regular or executive lines will be routed to the overflow position in selector 13.

The registering and transmitting operations of the code call circuit under control of an executive line are identical to those under control of a regular line which were previously described. When the called party answers, however, break contacts 203 on hunt sleeve relay 200 prevent the operation of the timing relay 620. Thus it can be seen that the executive calls are not subject to a 60 second time limit.

*Call from station STA2—Code call equipment busy*

Assume that a regular line has seized the code call circuit over the first choice point of access and that a code is being sounded and has not been answered. An executive line seizing the circuit over the second choice point of access operates calling bridge 2 relay 230 over a circuit extending from ground on contacts 321 through the upper winding of the relay over tip conductor T4, back over ring conductor R4, and through the lower winding of the relay to battery. Release delay 2 relay 240 operates from ground on contacts 231 and release delay 21 relay operates from ground on contacts 245. Resistance battery appearing on the HS4 conductor operates executive relay 300 through contacts 243. When contacts 307 open, the holding ground is removed for all operated digit register counting relays. The operating ground for the sending relay 610 is opened at contacts 308 on relay 300 to immediately terminate the sounding of the previous registered code. The holding ground for all impulse counting and digit counting relays in the sender circuit is also opened by the same contacts 308. Thus, the register and sender circuits of the code call circuit are immediately restored to normal.

Executive 1 relay 310, which is made slow operate because of the inclusion of thermistor T31 in its operating circuit, now operates from ground on contacts 302a. At contacts 312a, relay 310 connects grounded busy tone to the upper winding of calling bridge 1 relay 210 for the purpose of informing the party on the regular line that the code call circuit has been seized by an executive line. Contacts 318 and 319 on relay 310 shunt contacts 307 and 308 on relay 300 so that the holding circuits for the register and sender relays are reestablished. The pulsing delay relays, corresponding to relay 530, are thus operated so that digits dialed by the executive line can be registered in the digit registers. It is to be noted that the pulsing path for the digit registers extends from ground on break contacts 233, through contacts 244 and 305a to the previously described pulsing path from the first choice point of access relays. Also, the holding path for the pulsing delay relays extends from break contacts 232 on relay 230, through contacts 242 and 305 to the previously described pulse delay path from the relays controlled over the first choice point of access. Thus, dial impulses received over the second choice point of access are repeated to the register circuits and stored in a manner identical to that previously described. Executive 11 relay 330 is operated to its first step over a circuit extending from ground on contacts 302a, through contacts 411 and 332, but has no effect at this time.

When the call is answered, relay 420 operates as previously described and the operated register and sender relays are released as previously described. Timing relay 620 is prevented from operating since contacts 309a on relay 300 are included in its operating circuit. Thus the executive call on the second choice point of access is not subject to a time limitation.

Next assume that the previous call on the first choice point of access has been answered at the time that an executive line seizes the second choice point of access. Relays 230, 240, 300, and 320 operate as previously described. Disabling relay 400 now operates from ground on contacts 316a, through contacts 306, 413, and through its winding to battery. Relay 400 locks operated through contacts 405 and 412. At contacts 401, 402, 403, and 404, relay 400 interrupts the conversation path between the calling and called subscribers and connects grounded busy tone to conductors T8 and R8. The calling party is disconnected from the conversation path and given busy tone when executive 1 relay 310 operates, as previously described. Timing relay 620 is released by the operation of contacts 309a on relay 300 to discontinue the timing of the previous call. The executive can now dial the digits of the desired called line. It is to be noted that the holding circuit for the register relays is from ground on contacts 425a and through contacts 414 and 309 so long as the called party to the previous connection remains off-hook. When this party restores his handset, relay 420 releases and the holding ground for the register relays is then derived from ground on the contacts 425. Since this is a make before break combination on relay 420, there is no danger of releasing the register counting relays regardless of when the called party to the previous connection hangs up. The registering of the dial impulses transmitted by the executive line, the transmittal of the registered code to the signal devices, and answer by the called party are all identical to the operations previously described.

*Fire alarm*

A fire alarm code has priority over codes registered by either a regular subscriber line or an executive line. When the fire alarm relay 600 operates from ground forwarded over the fire alarm conductor, a continuous signal is transmitted to the signal devices. Operated contacts 601 on relay 600 connect operating ground to sending relay 610 through break contacts 755, 743, and 612. Operated make contacts 604 on relay 600 connect direct ground to the pulsing contacts 611 on the sending relay 610. Break contacts 602, 603, 607, and 608 serve to release any operated relays in the digit registers and the digit sender. Thus, the sending relay 610 is run self-interrupt to continuously energize the signal devices so long as the fire alarm relay 600 remains operated. At contacts 606, relay 600 removes the resistor-capacitor network R61, C61 from in parallel with the resistor-capacitor network R62, C62 so that sending relay 610 will operate faster than when it is controlled to transmit an ordinary code.

While there has been disclosed what is at present considered to be the preferred embodiment of the invention, other modifications will readily occur to those skilled in the art. For example, it is believed that the novel point of access control used in conjunction with the described code call circuit can readily be adapted for use in other communication establishing circuits. It is not, therefore, desired that the invention be limited to the specific arrangement shown and described, and it is intended to cover in the appended claims all such modifications as fall within the true spirit and scope of the invention.

What is claimed is:

1. In a telephone system, first and second classes of subscriber lines, a circuit utilized for extending communication connections between calling and called ones of said lines, first and second points of access to said circuit, means responsive to the seizure of said circuit over said first point of access by a calling line of said first class for marking only said first point of access as busy, and means responsive to the seizure of said circuit over said first point of access by a calling line of said second class for marking both said first and second points of access as busy.

2. In a telephone system, first and second classes of calling lines, a code call circuit having first and second points of access, means responsive to the seizure of said code call circuit over said first point of access by a calling line of said first class for marking only said first point of access as busy, and means responsive to the seizure of said code call circuit over said first point of access by a calling line of said second class for marking both said first and second points of access as busy.

3. In a telephone system, first and second classes of subscriber lines, a circuit utilized for extending communication connections between calling and called ones of said lines, said circuit having first choice and second choice points of access which may be marked as idle or busy, means controlled by a calling line for seizing said circuit over said first choice point of access when said first choice point of access is marked as idle and for seizing said circuit over said second choice point of access when said first choice point of access is marked as busy and said second choice point of access is marked as idle, means responsive to the seizure of said circuit over said first choice point of access by a line of said first class for marking only said first choice point of access as busy, and means responsive to the seizure of said circuit over said first choice point of access by a line of said second class for marking both said first choice and said second choice points of access as busy, whereby said circuit can be seized over said second choice point of access only after the circuit has been seized over said first choice point of access by a line of said first class.

4. In a telephone system, first and second classes of calling lines, a code call circuit having first choice and second choice points of access which may be marked as idle or busy, means controlled by a calling line for seizing said circuit over said first choice point of access when said first choice point of access is marked as idle and for seizing said circuit over said second choice point of access when said first choice point of access is marked as busy and said second choice point of access is marked as idle, means responsive to the seizure of said circuit over said first choice point of access by a line of said first class for marking only said first choice point of access as busy, and means responsive to the seizure of said circuit over said first choice point of access by a line of said second class for marking both said first choice and said second choice points of access as busy, whereby said circuit can be seized over said second choice point of access only after the circuit has been seized over said first choice point of access by a line of said first class.

5. In a telephone system, first and second classes of calling lines, a code call circuit having first and second calling points of access, means controlled by a first calling line of said first class for seizing said circuit over said first point of access, means in said circuit responsive to dial impulses transmitted over said first calling line for registering a code number, a signal device, means in said circuit for transmitting the registered code number to said signal device, means controlled by a second calling line for seizing said circuit over said second point of access, means in said circuit responsive to seizure over said second point of access only if said second calling line is of said second class for terminating the transmittal of the code number received over the first calling line, said circuit then being responsive to dial impulses received over said second calling line of said second class to register a second code number and then to transmit said second code number to said signal device.

6. In a telephone system, first and second classes of calling lines, a code call circuit having first and second calling points of access and an answering point of access, means controlled by a first calling line of said first class for seizing said circuit over said first point of access, means in said circuit responsive to dial impulses transmitted over said first calling line for registering the code number of a desired called line, a signal device, means in said circuit for transmitting the registered code number to said signal device, means controlled by the desired called line for seizing said circuit over said answering point of access to thereby establish a communication connection between the calling and called lines, means controlled by a second calling line for seizing said circuit over said second point of access, means in said circuit responsive to seizure over said second point of access only if said second calling line is of said second class for interrupting the previously completed communication connection, said circuit then being responsive to dial impulses received over said second calling line of said second class to register a second code number and then to transmit said second code number to said signal device.

7. In a telephone system, a code call circuit having first and second calling points of access, lines of first and second classes, said circuit being seizable over said first calling point of access by calling lines of either said first or second classes and seizable over said second calling point of access only after a calling line of said first class has seized said circuit over said first calling point of access, means in said circuit responsive to dial impulses received over said first point of access for registering the code number of a desired called line, a signal device, means in said circuit for transmitting the registered code number to said signal device, means responsive to the seizure of said circuit over said second point of access by a calling line of said second class only for terminating the transmission of the previously registered code number, said code call circuit then being operative under control of the calling line of said second class to register and transmit the code number of the same or another called line.

8. In a telephone system, first and second classes of subscriber lines, a circuit utilized for extending communication connections between calling and called ones of said lines, said circuit having first and second calling points of access, said circuit being seizable over said first calling point of access by calling lines of either said first or second classes and seizable over said second calling point of access only after a calling line of said first class has seized said circuit over said first calling point of access, means in said circuit controlled over a calling line of said first class via said first point of access for establishing a communication connection between said calling line of said first class and a selected called line, means responsive to the seizure of said circuit over said second point of access by a calling line of said second class only for interrupting the previously completed communication connection, said circuit then being controlled over said calling line of said second class via said second point of access to establish a communication connection between the calling line of said second class and the same or another selected called line.

9. In an telephone system, a code call circuit having first and second calling points of access and an answering point of access, lines of first and second classes, said circuit being seizable over said first calling point of access by calling lines of either said first or second classes and seizable over said second calling point of access only after a calling line of said first class has seized said circuit over said first calling point of access, means in said circuit responsive to dial impulses received over said first point of access for registering the code number of a desired called line, a signal device, means in said circuit for transmitting the registered code to said signal device, means controlled by the desired called line for seizing said circuit over said answering point of access to thereby establish a communication connection between the calling and called lines, means responsive to the seizure of said circuit over said second point of access by a calling line of said second class only for interrupting the previously completed communication connection, said code call circuit then being operative under control of the calling line of said second class to register and transmit the code number of the same or another called line.

References Cited in the file of this patent

UNITED STATES PATENTS

| | | |
|---|---|---|
| 2,151,767 | Hovland | Mar. 28, 1936 |
| 2,491,903 | Pearce | Dec. 20, 1949 |
| 2,584,210 | Kessler | Feb. 5, 1952 |
| 2,717,923 | Pharis | Sept. 13, 1955 |
| 2,722,566 | Peterson | Nov. 1, 1955 |
| 2,735,892 | Jones | Feb. 21, 1956 |
| 2,796,466 | Molnar | June 18, 1957 |